INVENTOR.
FRANK KRUEGER

March 21, 1944.　　　F. KRUEGER　　　2,344,546

APPARATUS FOR APPLYING TOPS TO CAN BODIES

Filed March 5, 1940　　　15 Sheets-Sheet 2

INVENTOR.
FRANK KRUEGER
BY
Fay, Colrich, Williams & Fay
ATTORNEYS.

March 21, 1944.   F. KRUEGER   2,344,546
APPARATUS FOR APPLYING TOPS TO CAN BODIES
Filed March 5, 1940   15 Sheets-Sheet 3

INVENTOR.
FRANK KRUEGER
BY
ATTORNEYS

March 21, 1944.   F. KRUEGER   2,344,546
APPARATUS FOR APPLYING TOPS TO CAN BODIES
Filed March 5, 1940   15 Sheets-Sheet 4

INVENTOR.
FRANK KRUEGER
BY
ATTORNEYS.

March 21, 1944.    F. KRUEGER    2,344,546
APPARATUS FOR APPLYING TOPS TO CAN BODIES
Filed March 5, 1940    15 Sheets-Sheet 5
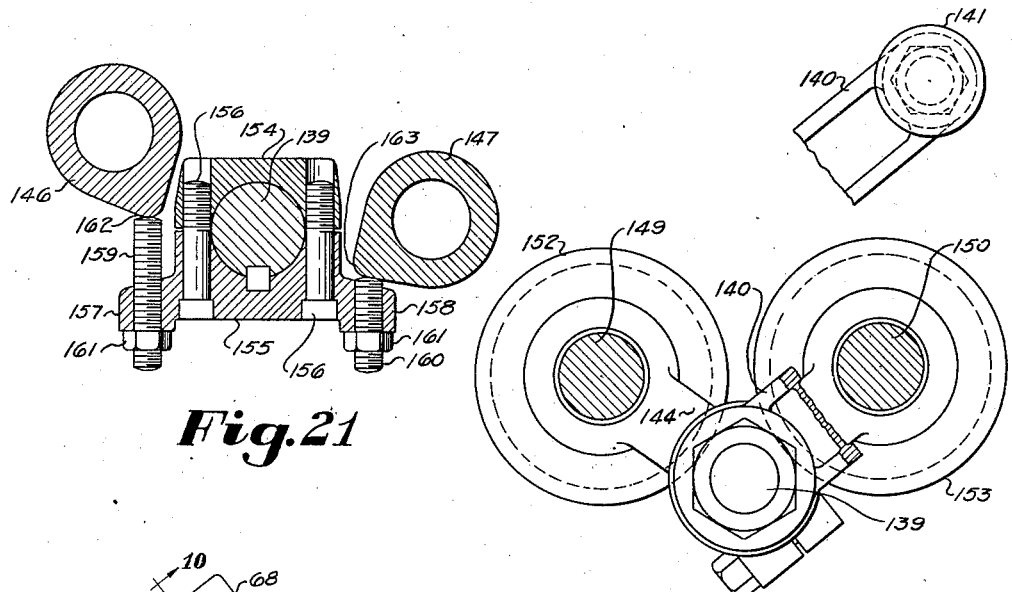
Fig.21
Fig.22
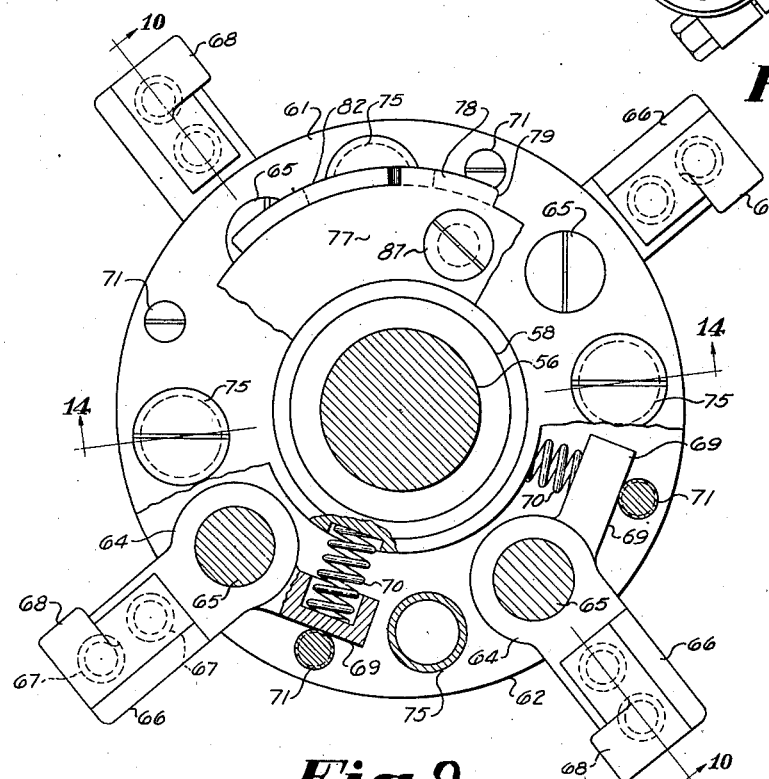
Fig.9
INVENTOR.
FRANK KRUEGER
BY
ATTORNEYS.

March 21, 1944.  F. KRUEGER  2,344,546
APPARATUS FOR APPLYING TOPS TO CAN BODIES
Filed March 5, 1940  15 Sheets-Sheet 6

INVENTOR.
FRANK KRUEGER
BY
ATTORNEYS.

March 21, 1944.   F. KRUEGER   2,344,546
APPARATUS FOR APPLYING TOPS TO CAN BODIES
Filed March 5, 1940   15 Sheets-Sheet 7

INVENTOR.
FRANK KRUEGER
BY Fay, Golrick, Williams & Fay
ATTORNEYS.

March 21, 1944.    F. KRUEGER    2,344,546
APPARATUS FOR APPLYING TOPS TO CAN BODIES
Filed March 5, 1940    15 Sheets-Sheet 8

INVENTOR.
FRANK KRUEGER
BY
ATTORNEYS.

March 21, 1944. F. KRUEGER 2,344,546
APPARATUS FOR APPLYING TOPS TO CAN BODIES
Filed March 5, 1940 15 Sheets-Sheet 9

INVENTOR.
FRANK KRUEGER
BY
ATTORNEYS.

March 21, 1944. F. KRUEGER 2,344,546
APPARATUS FOR APPLYING TOPS TO CAN BODIES
Filed March 5, 1940 15 Sheets-Sheet 10

INVENTOR.
FRANK KRUEGER
BY
ATTORNEYS.

March 21, 1944.   F. KRUEGER   2,344,546
APPARATUS FOR APPLYING TOPS TO CAN BODIES
Filed March 5, 1940   15 Sheets-Sheet 12

INVENTOR.
FRANK KRUEGER
BY
ATTORNEYS.

March 21, 1944. F. KRUEGER 2,344,546
APPARATUS FOR APPLYING TOPS TO CAN BODIES
Filed March 5, 1940 15 Sheets-Sheet 13

INVENTOR.
FRANK KRUEGER
BY
ATTORNEYS

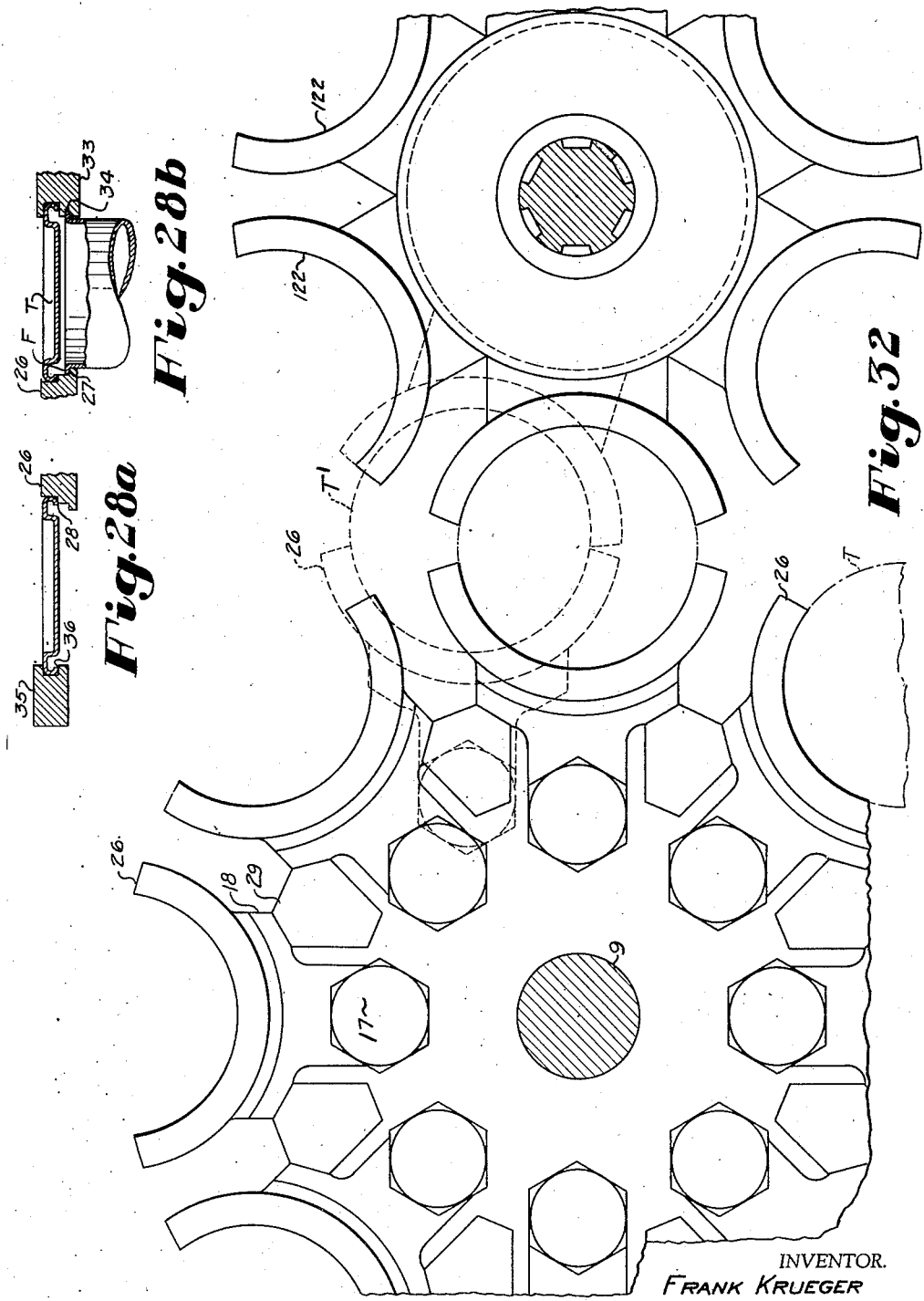

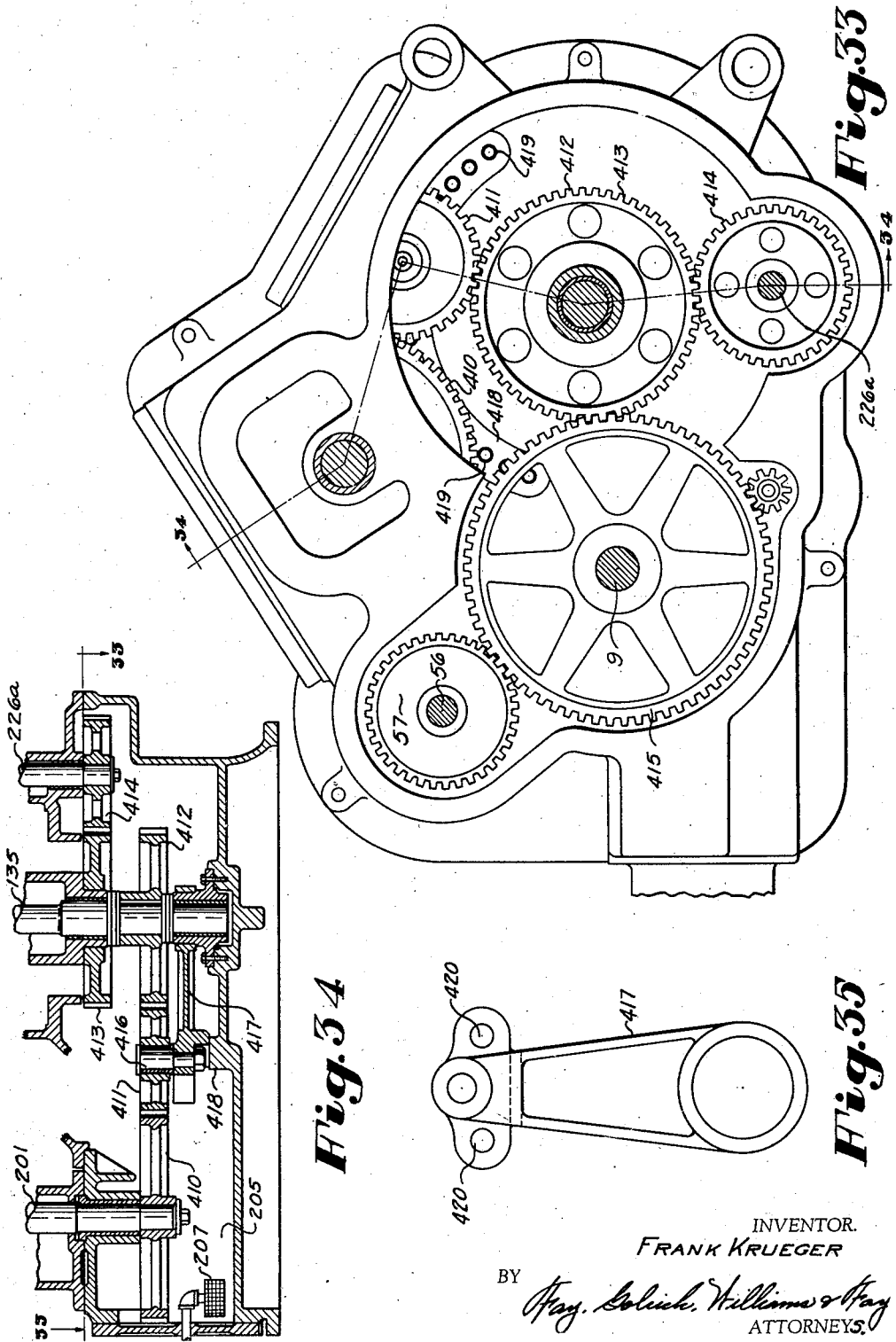

Patented Mar. 21, 1944

2,344,546

UNITED STATES PATENT OFFICE 2,344,546

APPARATUS FOR APPLYING TOPS TO CAN BODIES

Frank Krueger, Milbrae, Calif., assignor to E. W. Bliss Company, Brooklyn, N. Y., a corporation of Delaware Application March 5, 1940, Serial No. 322,327

4 Claims. (Cl. 113—113)

This invention relates, as indicated, to apparatus for applying ends to containers such as cans and the like.

In my co-pending application, Serial No. 288,977, I have disclosed apparatus for feeding containers, such as can bodies from one fabricating operation to another, and more particularly, the feeding of filled can bodies into a can head seaming mechanism by means of which the can top is affixed to the can body. The seaming mechanism and associated elements were only fragmentarily illustrated in such application.

The present application is concerned more particularly with the means for assembling the bodies and tops in relation to be seamed and for transferring the assembled parts to a seaming mechanism.

A primary object of the invention is to provide an apparatus for continuously assembling and securing can tops and can bodies while moving in predetermined paths designed not only to conserve space, but to materially increase the production of seamed cans.

Another object of the invention is to provide novel means in the form of a revoluble dial for assembling can bodies and tops in relation to be seamed.

Other objects and advantages of the invention will be apparent during the course of the following description.

In the accompanying drawings, forming a part of this specification, and in which like numerals are employed to designate like parts throughout the same, Fig. 1 is a top plan view of apparatus embodying the invention;

Fig. 9 is a view partly in plan and partly in section of the can top feed mechanism;

Fig. 21 is a horizontal cross-sectional view, taken on the line 21—21 of Fig. 20;

Fig. 22 is a plan view showing the relation of the seaming rolls to the roll actuating cam lever;

Fig. 28 is a view, partly in elevation and partly in section, taken on the line 28—28 of Fig. 2, and showing mechanism for actuating the can top pilot valve;

Fig. 28a is a cross-sectional view, taken on the line 28a—28a of Fig. 2;

Fig. 28b is a cross-sectional view taken on the line 28b—28b of Fig. 2;

Fig. 29 is a fragmentary cross-sectional view, taken on the line 29—29 of Fig. 2, and showing the relation of the can body and top at the beginning of their movement in the seaming head;

Fig. 30 is a view similar to Fig. 29, taken on the line 30—30 and showing the relation of the can body and top immediately prior to the seaming operation;

Fig. 31 is a view similar to Figs. 29 and 30, and showing the finished product;

Fig. 32 is an enlarged view, showing the transfer of the can body and top from the feed dial to the seaming head.

Fig. 33 is a cross-sectional view, taken on the line 33—33 of Fig. 34, and showing a portion of the driving mechanism;

Fig. 34 is a cross-sectional view of a portion of the driving mechanism, taken on the line 34—34 of Fig. 33; and Fig. 35 is a plan view of the idler gear supporting arm, shown in Fig. 34.

Figure 1:
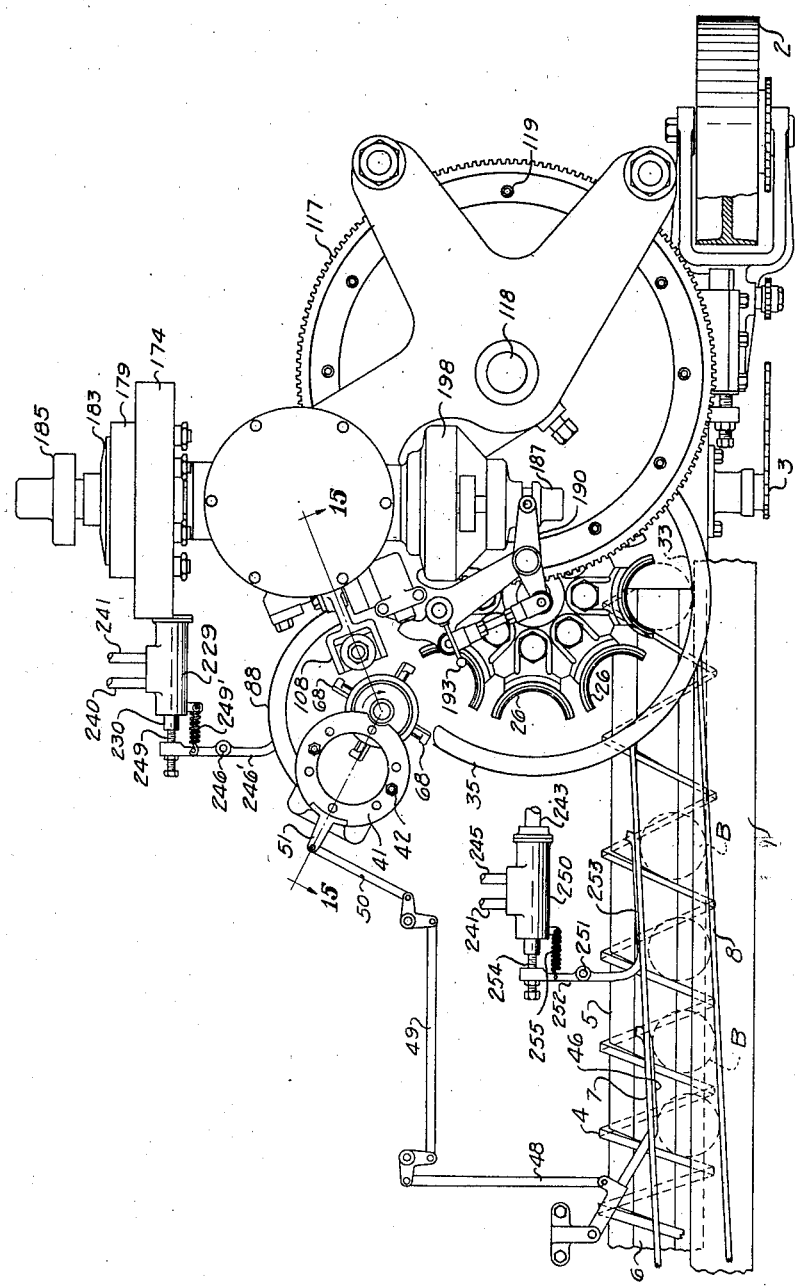
Figure 2:
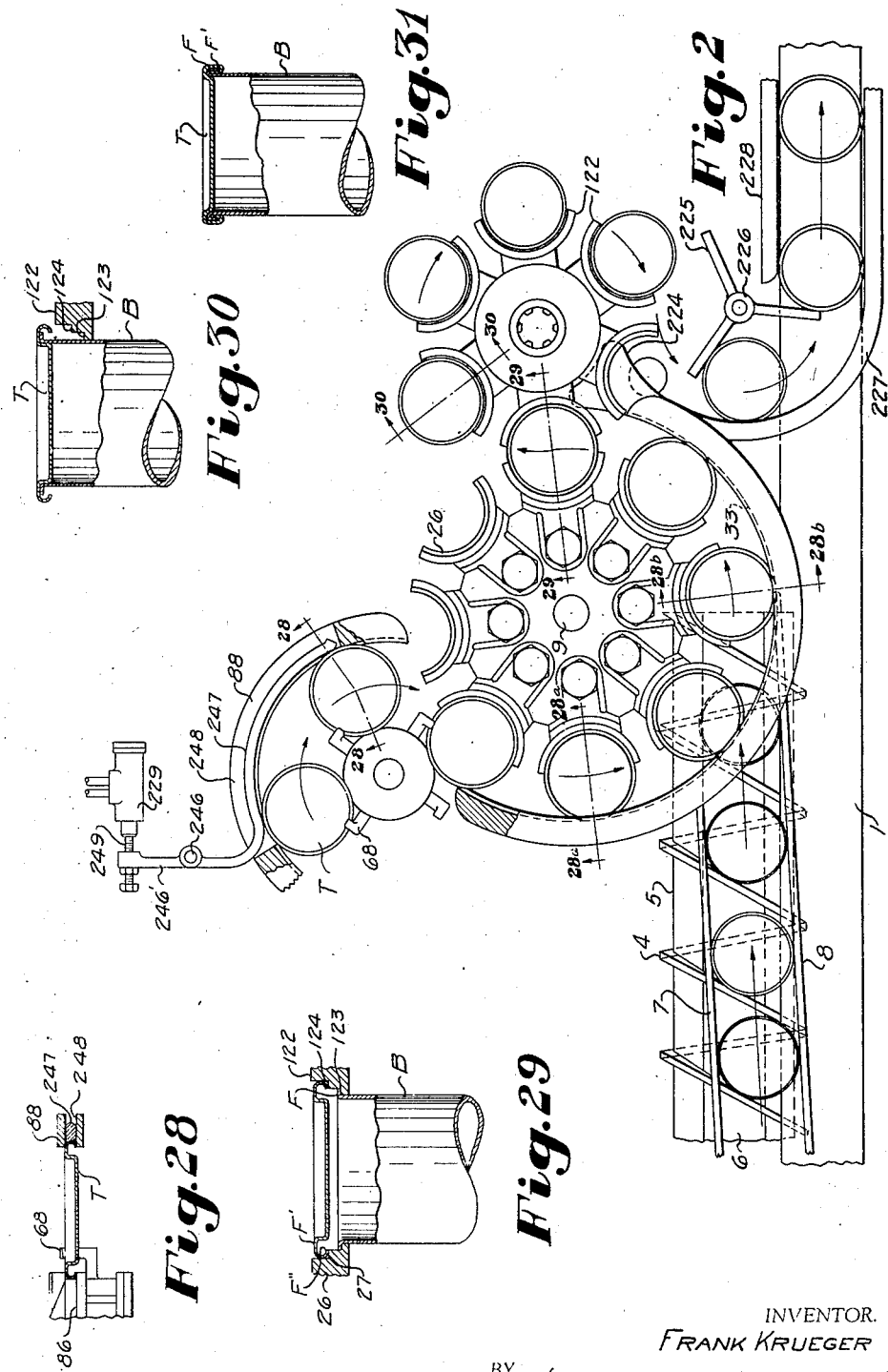
Fig. 2 is a view, partly in plan and partly in section, on the plane of the can top travel.
Figure 3:
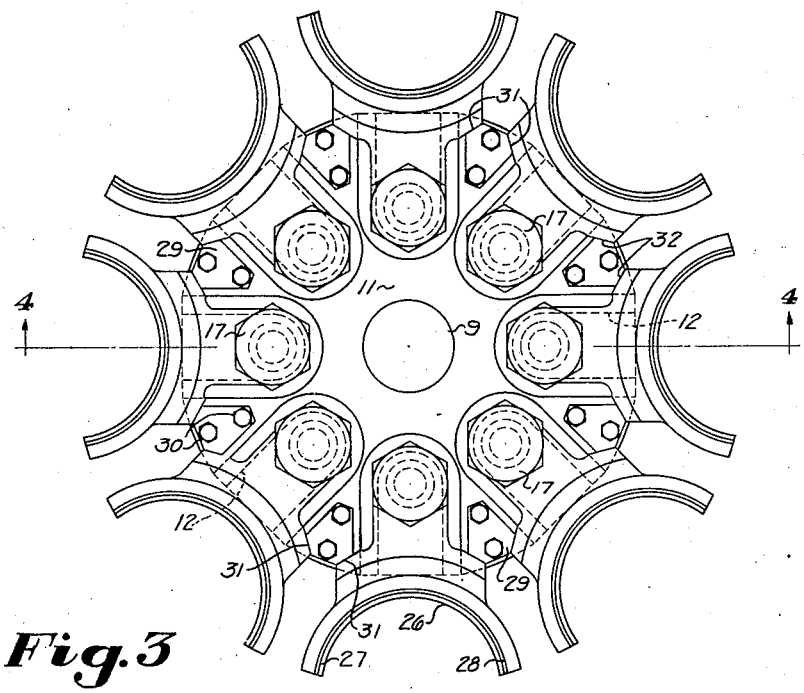
Fig. 3 is a plan view of the can body and top feed dial.

For the purpose of feeding the can bodies to the apparatus, mechanism similar to that disclosed in my co-pending application, Serial No. 288,977, is employed. Such mechanism, as shown in Figs. 1 and 2, includes an endless belt 1, which passes over a pair of pulleys, only one of which, designated by reference numeral 2, is shown. The pulleys, and consequently the belt is driven from a sprocket 3 mounted for rotation in synchronism with a spiral driving mechanism which includes a rotatable spiral 4, which revolves about a stationary cylindrical element 5 flattened on its top as at 6 to provide a can body supporting top which is substantially flush with the belt 1.

Can bodies are fed to the endless belt conveyor 1 and by it are carried into a path defined by guide rails 7 and 8 extending at a slight angle to the axis of the spiral member, as shown in Figs. 1 and 2, these rails acting to guide can bodies off of the belt 1 and onto the top 6 of the element 5, from which they are fed to seaming mechanism by means of a feed dial to be presently described. The detailed construction of the foregoing can body feeding mechanism is described in the aforesaid application, to which reference may be had for further description thereof.

Can body and top feed dial

The dial and associated mechanism for feeding the can bodies and tops to the seaming mechanism is shown most clearly in Figs. 1, 2, 3, 4 and 32.

Such mechanism includes a vertical rotatable shaft 9 having keyed thereto a sleeve 10 provided at its upper end with a horizontal flange or dial 11 having a multiplicity of circumferentially spaced radially extending recesses 12 on the periphery thereof. Disposed in each of these recesses is a radially movable block 13, which is maintained against displacement in a vertical direction by means of upper and lower retainer plates 14 and 15 respectively, which have a contour generally similar to that of the recesses 12 but are somewhat larger in area than the latter. The blocks 13 and plates 14 and 15 are secured together by means of stove bolts 16.

Figure 4:
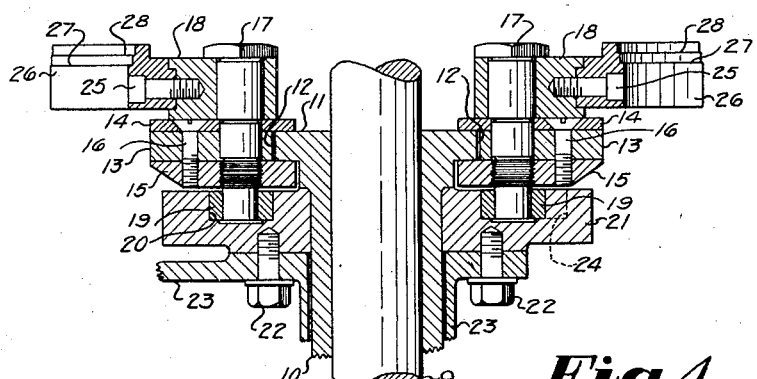
Fig. 4 is a fragmentary cross-sectional view of the can body and top feed dial, taken on the line 4—4 of Fig. 3.

Secured to the plates 14, as by means of pivot pins 17, are brackets 18, the pins having portions of reduced diameter which extend through the plates 14 and blocks 13, thread portions engaged by the plates 15 and end portions provided with cam rollers 19. The rollers 19 are adapted to traverse a cam track 20 in the upper portion of a stationary cam plate 21, which is concentric with the shaft 9, and is secured, as by bolts 22 to a bracket or other support 23. The cam track 20 is, for the most part, circular, but at a predetermined point thereof, as is indicated by reference numeral 24 in Fig. 4, is formed to cause a slight radially outward movement of the rollers 19, for a purpose to be hereinafter described.

Secured, as by set screws 25, to each of the brackets 18, is a can body and can top supporting mould member 26. Each member is in the form of an arc of slightly less than 180°, and is counterbored to provide ledges 27 and 28, the functions of which will presently be described. It may be stated at this point that when the bracket 18 and its support are in positions radially outward of the positions shown in Figs. 3 and 4, as effected by the high cam portion as indicated at 24, they are capable of a limited degree of pivotal movement about the pins 17, the extent of such movement being determined by stop plates 29, which are secured to the dial 11 by means of cap screws 30. The plates 29 have beveled surfaces 31, which, in the normal position of the brackets 18, are engaged by similarly beveled surfaces 32 on the brackets.

Concentric with the dial 11 and spaced therefrom a distance approximately equal to the diameter of the cans to be fed by the dial is an arcuate support, track or guide 33 having a ledge 34 which coacts with the ledges 27 of the members 26 in supporting the can bodies by their upper flanges during their movement to the seaming mechanism. A similar, but longer, guide 35 is disposed above the guide 33 and is provided with a ledge 36 which coacts with the ledges 28 of the members 26 in supporting the can tops by their flanges during their movement to positions coaxial with the can bodies and during their movement to the seaming mechanism.

Can top feed mechanism

Mechanism is provided for feeding the can tops from a stack of such tops to the feed dial which has been described, such mechanism and associated mechanism being most clearly illustrated in Figs. 1, 2 and 5 to 15 inclusive.

Figure 10:
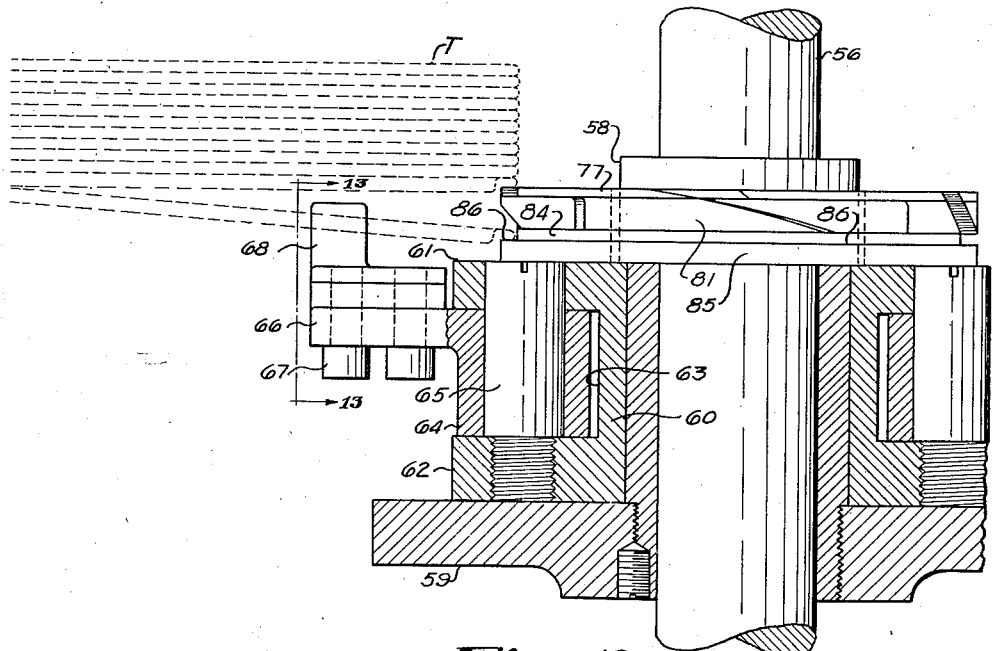
Fig. 10 is a fragmentary cross-sectional view of the can top feed mechanism, taken on the line 10—10 of Fig. 9.
Figure 14:
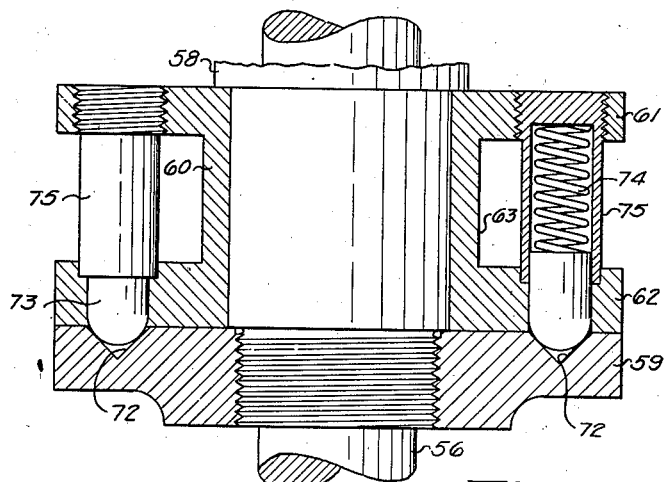
Fig. 14 is a sectional view of the drive for the can top feeding and stripping mechanism, taken on the line 14—14 of Fig. 9.
Figure 16:
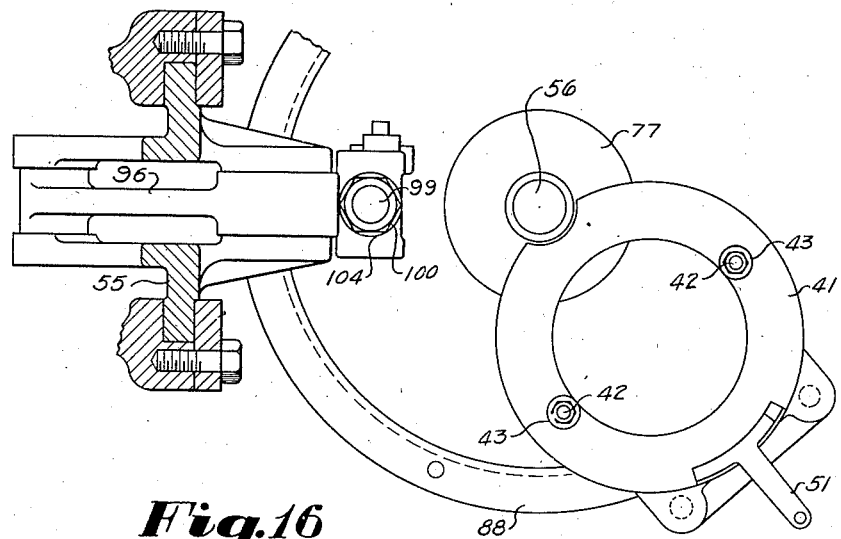
Fig. 16 is a view, partly in plan and partly in section of the mechanism shown in Fig. 15.

Disposed adjacent the feed dial is a can top magazine, which, as shown in Figs. 5 to 8 inclusive, includes a cylindrical casing 37 within which is disposed a stack of can tops T, indicated by the dotted lines in Fig. 10. The casing 37 is counterbored to provide a ledge 39, upon which is mounted an oscillatable ring gear 40, this gear being maintained against vertical displacement by means of an annular cover plate 41 which rests upon the casing 37.

The gear 40 forms a part of mechanism which is designed to prevent removal of can tops from the magazine at such times when can bodies are not being fed to the apparatus. Such mechanism includes a pair of cam members 42 disposed in the casing 37, with one of such members diametrically opposite the other. Each cam member is supported upon a thrust bearing 43 which rests upon the plate 41 and is thus oscillatable about its vertical axis. Each member is also provided adjacent its upper end with gear teeth 44 which are in mesh with the gear 40, and is provided at its lower end with a shoe 45.

Figure 5:
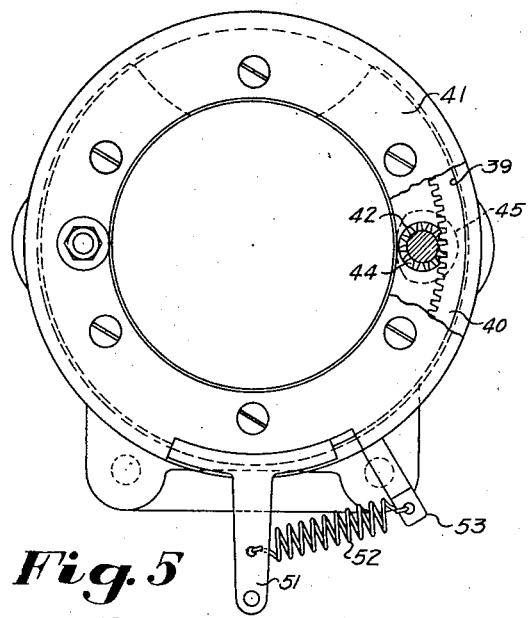
Fig. 5 is a top plan view of the can top magazine, with a portion broken away to more clearly show the mechanism for actuating the "no-feed" cams.
Figure 8:
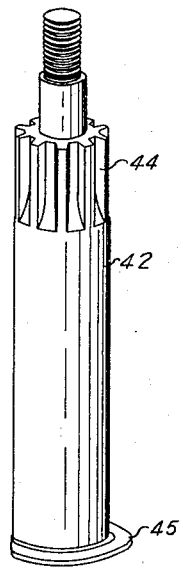
Fig. 8 is a perspective view of one of the "no-feed" cams.
Figures 6, 7:
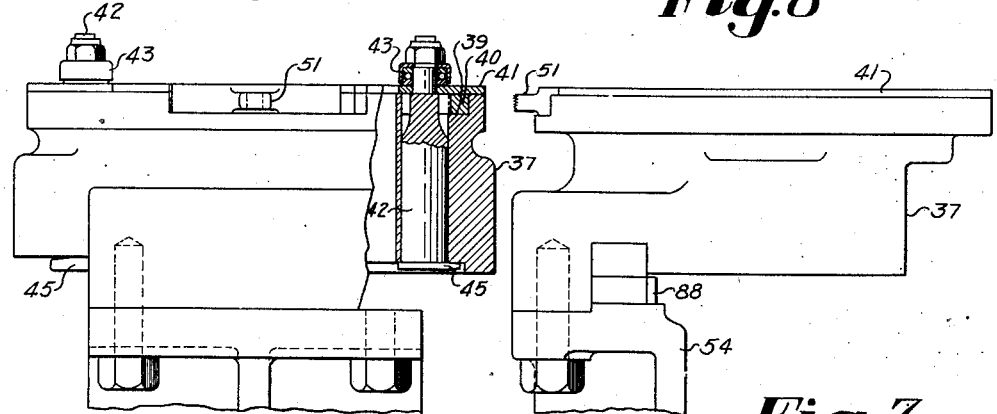
Fig. 6 is a view partly in front elevation and partly in section of the magazine shown in Fig. 5.
Fig. 7 is a side elevation of the magazine shown in Figs. 5 and 6.

The shoes 45 are normally maintained in the position shown in Figs. 5 and 6 by the movement of the can bodies B, indicated by the dotted lines in Fig. 1, past a lever 46. In passing this lever, the can bodies exert a pressure on such lever, causing it to move in a counterclockwise direction, as viewed in Fig. 1, which, in turn, imparts movement to a series of connected levers 48, 49 and 50, thence to an arm 51 projecting from the ring gear 40, thereby moving such arm to the position shown in Fig. 5. The ring gear, as a result of this movement of the arm 51, rotates sufficiently to in turn rotate the cam members 42 to move the shoes 45 clear of the opening in the casing 37, thereby permitting can tops to be removed from the bottom of the magazine.

In the event that there is a cessation of can body movement past the lever 46, a coil spring 52, which interconnects the arm 51 with a bracket 53 on the casing 37, causes the arm to move in a counterclockwise direction, as viewed in Fig. 5, resulting in oscillation of the cam members 42 to bring the shoes 45 in the path of movement of the can tops, thereby preventing removal of such tops from the magazine. The casing 37 and plate 41 are recessed to provide shoulders which act as stops for determining the movement of the arm 51 in both directions.

Figure 15:
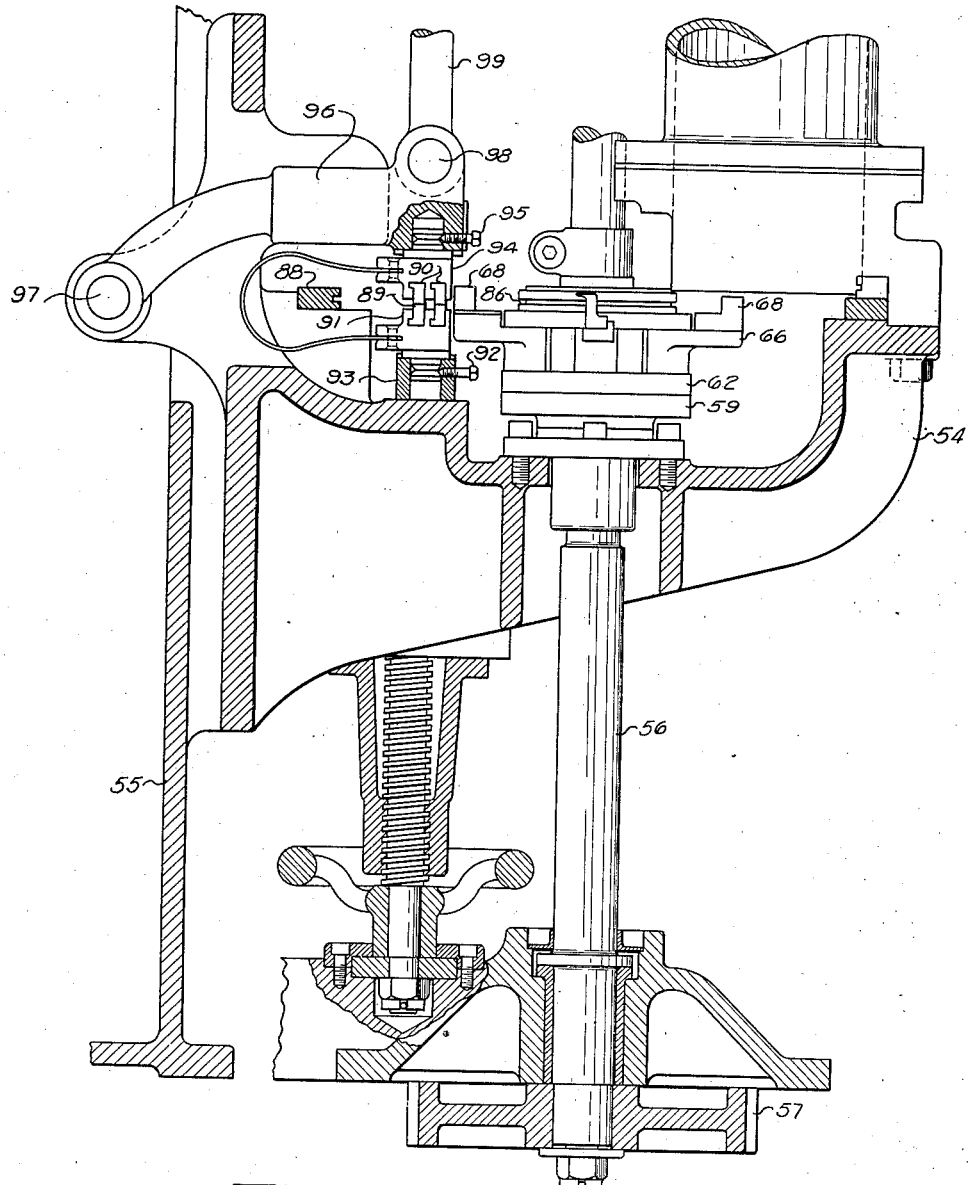
Fig. 15 is a view, partly in elevation and partly in section taken on the line 15—15 of Fig. 1, and showing the can top embossing mechanism and the drive for the can top feeding mechanism.

The can top magazine is stationarily mounted on a bracket 54, which, as shown in Fig. 15, extends from the frame 55 of the apparatus, and has journalled therein a vertically extending shaft 56, having a driving gear 57 secured thereto adjacent its lower end.

As shown most clearly in Figs. 1, 2 and 9 to 16, inclusive, the shaft 56 carries on its upper end a sleeve 58. A drive plate 59 is threadedly secured to the lower end of the sleeve 58. Disposed above the drive plate 59 and about the sleeve 58 is an annular sleeve-like member 60 having outwardly extending flanges 61 and 62 at its upper and lower ends respectively, said flanges providing an annular recess 63 for the reception of levers 64, mounted for pivotal movement about pins 65, which are in threaded engagement with the flange 62.

Figure 13:
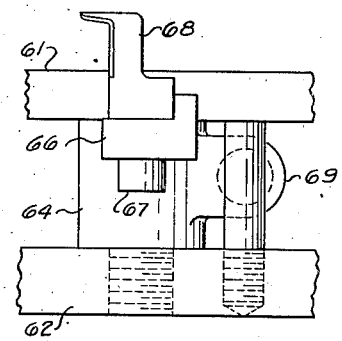
Fig. 13 is a fragmentary elevational view of one of the can top feed fingers.
Figure 11:
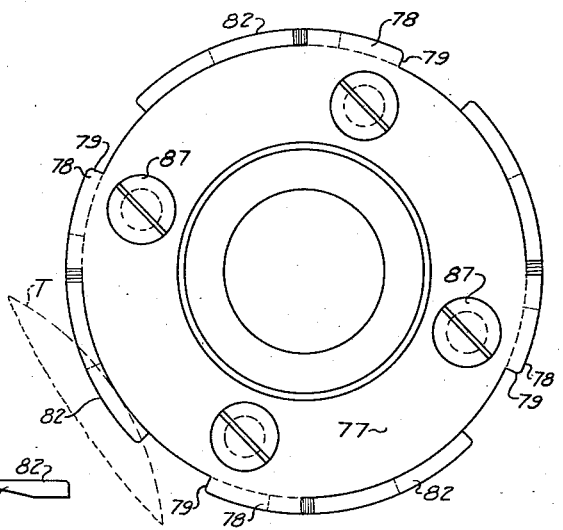
Fig. 11 is a plan view of the can top stripper.
Figure 12:
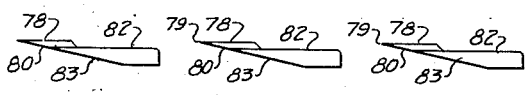
Fig. 12 is a development of several knives of the can top stripper.

Each of the levers 64 is provided with a radially outwardly extending bracket 66 upon which is removably secured, as by screws 67, a feed finger 68. Each lever 64 is further provided with a socketed extension 69, between which and the member 60 is disposed a coil spring 70, designed to permit pivotal movement of the lever 64 in a counterclockwise direction, as viewed in Fig. 9. Movement of the lever 64 in the opposite direction is limited by a stop pin 71, which, as shown in Fig. 13, is threadedly secured to the flange 62 of the member 60. The function of the springs 70 will hereinafter appear.

The member 60 is adapted to be driven by the drive plate 59, and for this purpose is provided in its upper face with a series of V-shaped recesses 72 (Fig. 14), into which extend drive pins 73, which are normally maintained in such recesses by means of coil springs 74, the lower ends of which bear against the pins 73 and the upper ends of which bear against sockets 75, which are threadedly secured to the flange 61 and within which the springs and portions of the pins are housed. The purpose of driving the member 60 in this manner is to permit the pins 73 to move out of the recesses 72 and the member 60 to cease rotation in the event undue resistance is encountered by the feed fingers 68. In other words, it is a safety feature, preventing damage to the apparatus before an opportunity is had to stop the operation of the apparatus. The function of the feed fingers 68 will presently be described.

The sleeve 58 is extended to a point somewhat above the flange 61 of the member 60 and such extended portion, as shown in Figs. 9 and 10, locks the member 60 to the plate 59. Surrounding the sleeve 58 is a plate 77 having four circumferentially spaced stripper knives 78, which are adapted to strip the can tops from the bottom of the stack. Each knife has a sharp forward edge 79 and an undercut surface 80, it being noted at this point that the knives are in staggered relation with the feed fingers 68.

Disposed immediately below the plate 77 is a second plate 81 having four circumferentially spaced radial projections 82 which provide support for the knives 78 and have undercut surfaces 83 which are, in effect, continuations of the surfaces 80. Below the plate 81 is a spacer plate 84 of an outer diameter smaller than that of the plate 77, and below the plate 80 is a plate 85 of somewhat larger diameter than that of the plate 84 for supporting the can tops after they have been stripped from the stack. The plates 77, 81, 84 and 85 are secured to the flange 61 of the member 60 by means of screws 87.

As the can tops T are stripped, one at a time, from the bottom of the stack (see Fig. 10), by means of the knives 78, each knife stripping one top, the inner edge of each top falls onto the ledge 86, the undercut surfaces 80 and 83 facilitating this operation. The outer edge of such top momentarily remains at the knife level, being supported at such level by means of an arcuate guide 88. Then, as one of the fingers 68 pushes such top in the direction indicated by the arrow in Fig. 2, the outer edge thereof descends to the level of the ledge 86, the ledge of the guide 88, upon which such outer edge of the top rests, gradually sloping downwardly for this purpose.

*Can top embossing mechanism*

Means are also provided for embossing certain desired indicia on the can tops, preferably at a point in advance of the movement of such tops into the can body feed dial.

Such means is best illustrated in Figs. 1, 15, 16, 17, 18 and 23 and comprises stationary embossing dies 89 (Fig. 15) and movable embossing dies 90. The dies 89 are mounted in a die holder 91, which is removably secured, as by a set screw 92, to a tubular support 93 mounted on the bracket 54. The dies 90 are similarly mounted in a die holder 94, which is removably secured, as by means of a set screw 95, to an arm 96, pivoted as at 97 to the frame 55.

Figure 17:
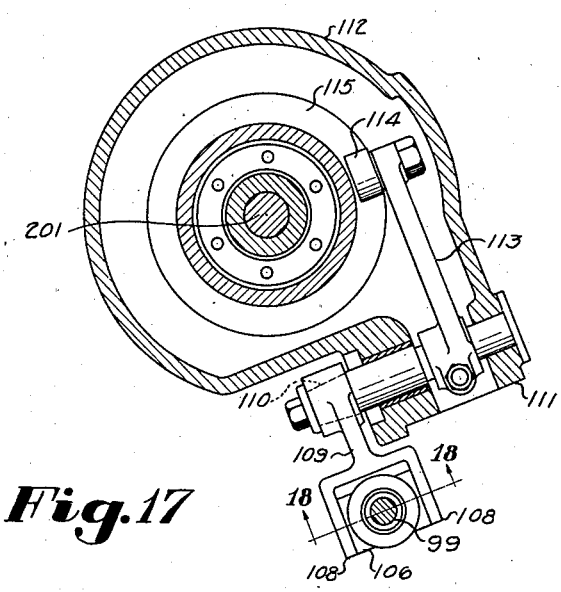
Fig. 17 is a horizontal cross-sectional view of cam mechanism for actuating the can top embossing mechanism.
Figure 18:
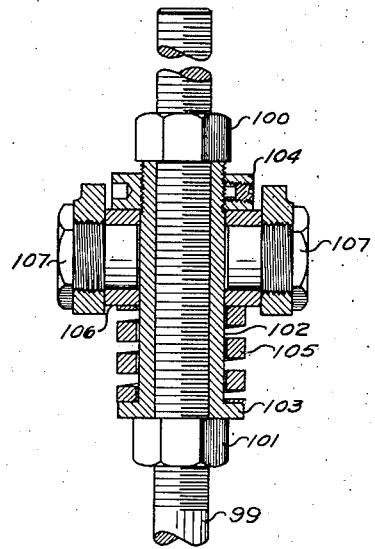
Fig. 18 is a fragmentary cross-sectional view, taken on the line 18—18 of Fig. 17.
Figure 24:
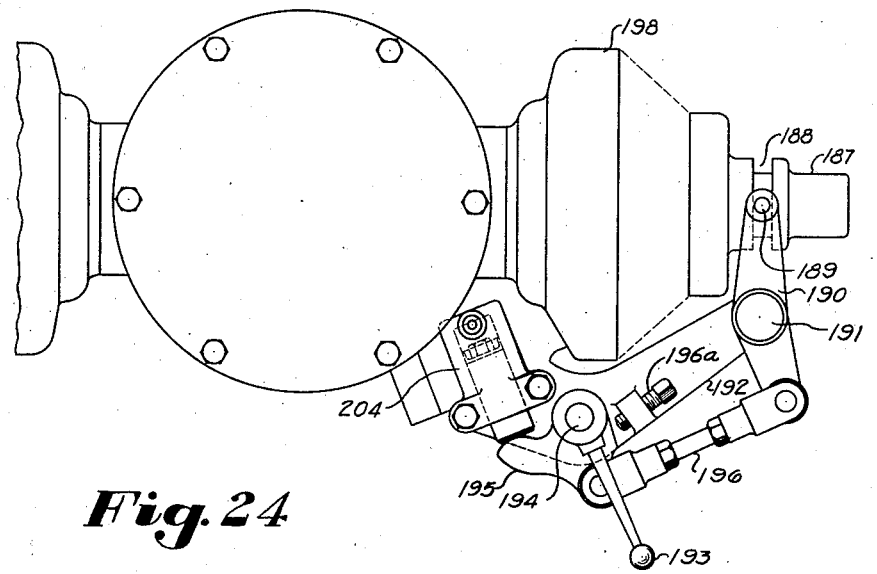
Fig. 24 is a fragmentary plan view, showing the clutch and brake actuating levers.
Figure 19:
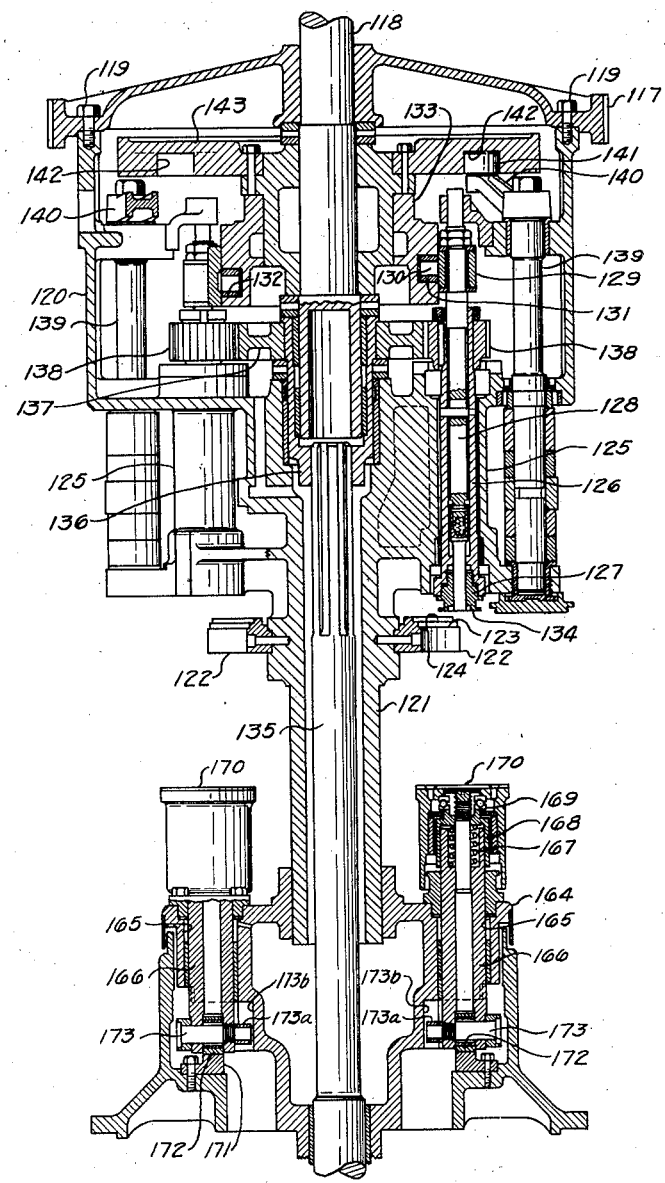
Fig. 19 is a vertical cross-sectional view through the multiple-spindle double-seaming head.

The arm 96 has a pin 98 extending transversely therethrough to which is pivotally secured the lower end of a rod 99 (Figs. 17 and 18). The upper end of the rod 99 has secured thereto, as by means of nuts 100 and 101, a sleeve 102 provided at its lower end with a flange 103. Slidably mounted on the sleeve 102, between a nut 104 which is threadedly secured to the upper portion of the sleeve and a coil spring 105 whose lower end abuts the flange 103, is a block 106, within the ends of which are received pins 107, which are threadedly secured to the arms 108 of a lever 109.

The lever 109 is keyed to a stub shaft 110 which is journalled in an extension 111 of a housing 112, such shaft having also keyed thereto, in offset relation to the lever 109, a second lever 113, provided at its inner end with a cam roller 114. The roller 114 rides in a cam groove 115 (see Fig. 23) in a rotatable cam 116. As the cam 116 is rotated, the lever 113 is oscillated, resulting in reciprocating movement of the rod 99, and hence repeated movement of the dies 90 which cooperate with the dies 89 to emboss the can tops, as they are moved by the feed fingers 68 to a position between such dies.

During the embossing operation, there is an imperceptible, but nevertheless actual, pause in the movement of the can top which is being embossed. During this pause, the feed finger 68, which is in engagement with such can top must also pause, but since the member 60 continues to rotate, the spring 70 will be compressed to compensate for such pause. After the embossing operation, the spring 70 expands, causing the feed finger 68 to reassume its normal position.

The embossed tops are fed onto the ledges 28 and 36 of the dial members 26 and guide 35 respectively, and are carried by the dial to a position in which each can top directly overlies, or is in registry with, the can body. The relation of the can body and top immediately prior to their removal from the aforesaid dial and transfer to the seaming mechanism is clearly shown in Fig. 29.

Seaming mechanism

Mechanism is provided for applying the can tops to the bodies by two seaming operations, such mechanism being best illustrated in Figs. 1, 2, 19, 20, 21, 22, 23 and 32.

Such mechanism includes a rotatable gear 117 which revolves about a stationary shaft 118, the gear 117 having secured thereto, as by bolts 119, a head 120 having a depending tubular central portion 121 upon which are mounted six circumferentially spaced can body and can top supporting members 122, each of which is in the form of an arc of slightly less than 180 degrees and is counterbored to provide ledges 123 and 124 which are coplanar with the ledges 27 and 28 respectively, of the members 26 of the feed dial.

The head 120 has a plurality of tubular extensions 125 depending therefrom, the axes of which are in alignment with the axes of the members 122, and disposed for rotation within such extensions are hollow spindles 126 to which are secured removable chucks 127. Extending through the spindles 126 are knock-out rods 128, to the upper ends of which are secured sleeves 129 having laterally extending stub shafts 130 upon which are mounted cam rollers 131 adapted to traverse a cam groove 132 in a stationary cam 133. The cam 133 is designed to lower the knock-out rods so as to strip the cans from the chucks 127 at the conclusion of the seaming operations. The chucks 127 have flanges 134 at their lower ends which fit within the can tops and engage the flange at the periphery of such tops so as to cooperate with the seaming rolls to produce the desired seams at the tops of the cans.

Means are provided for continuously rotating the chucks 127, such means including a rotatable shaft 135 which is disposed within the tubular portion 121 of the head 120 and is splined at its upper end to a sleeve 136 having keyed thereto a gear 137 which is in mesh with pinions 138 which are keyed to the spindles 126.

Mounted within the head 120 for rotation by such head and for oscillation about their own axes are shafts 139 to the squared upper ends of which are secured upwardly and angularly extending levers 140 which carry cam rollers 141, such rollers riding in a cam groove 142 in the lower surface of a stationary cam 143. The function of this cam will be presently described.

Portions of the shafts 139 extend exteriorly of the head 120 and have pivotally secured thereto, as by means of their vertically spaced ears 144 and 145 respectively, tubular casings 146 and 147, the ears 144 and 145 being disposed angularly with respect to each other, such angularity being maintained by tightening a nut 148 which causes the ears to tightly engage each other.

Mounted within the casing 146 and 147 respectively, are revoluble spindles 149 and 150, to the lower ends of which are secured, as by means of bolts 151, seaming rollers 152 and 153 respectively. One of these rollers is designed to perform a preliminary seaming operation and the other the final seaming operation.

In order to permit the same seaming rollers to be used for seaming cans of different diameters, means are provided for varying the angularity between the casings 146 and 147. Such means comprises a pair of members 154 and 155 which are clamped to the shaft 139 at a point intermediate the ears 144 and 145, as by means of screws 156, the member 155 being keyed to the shaft, as shown in Fig. 21. The member 155 is provided with ears 157 and 158, having adjusting screws 159 and 160 secured therein. These screws may be locked in adjusted position by means of lock nuts 161. The screws are adapted to engage radially extending projections 162 and 163 of the casings 146 and 147. Fig. 21 shows, for purpose of illustration only, the two extreme angular positions of the casings 146 and 147 relative to the spindle 139 as effectable by adjustments of the screws 159 and 160. While the aforesaid adjustment is designed primarily to vary the angularity between the casings, it may also be used for the purpose of making such slight adjustments as are required to bring the seaming rollers in proper relation with the cans to be seamed.

Secured to the tubular portion 121 of the head 120, so as to be rotatable therewith, is a spider 164 having circumferentially spaced openings 165 in which are disposed hollow spindles 166, which, by means of springs 167, resiliently support sleeves 168, carrying thrust bearings 169, upon which are rotatably mounted can body lifts 170. These lifts are adapted to be elevated and lowered at predetermined intervals, and for this purpose, an annular stationary cam 171 is provided, having a cam surface thereon adapted to be traversed by cam rollers 172 mounted on pins 173 which extend from the spindles 166. It will be noted that the lifts 170 directly underlie and are in axial alignment with the chucks 127. In order to prevent rotation of the spindles 166 about their axes, the pins 173 have mounted therein rollers 173a, which move in vertical slots 173b in the spider 164 during upward and downward movement of the spindles, thus preventing the spindles from turning.

Driving mechanism

The various units which have been described are adapted to be driven in synchronism with each other, and for this purpose driving mechanism is employed, which is best illustrated in Figs. 1, 17, 23, 24, 33, 34 and 35.

Figure 23:
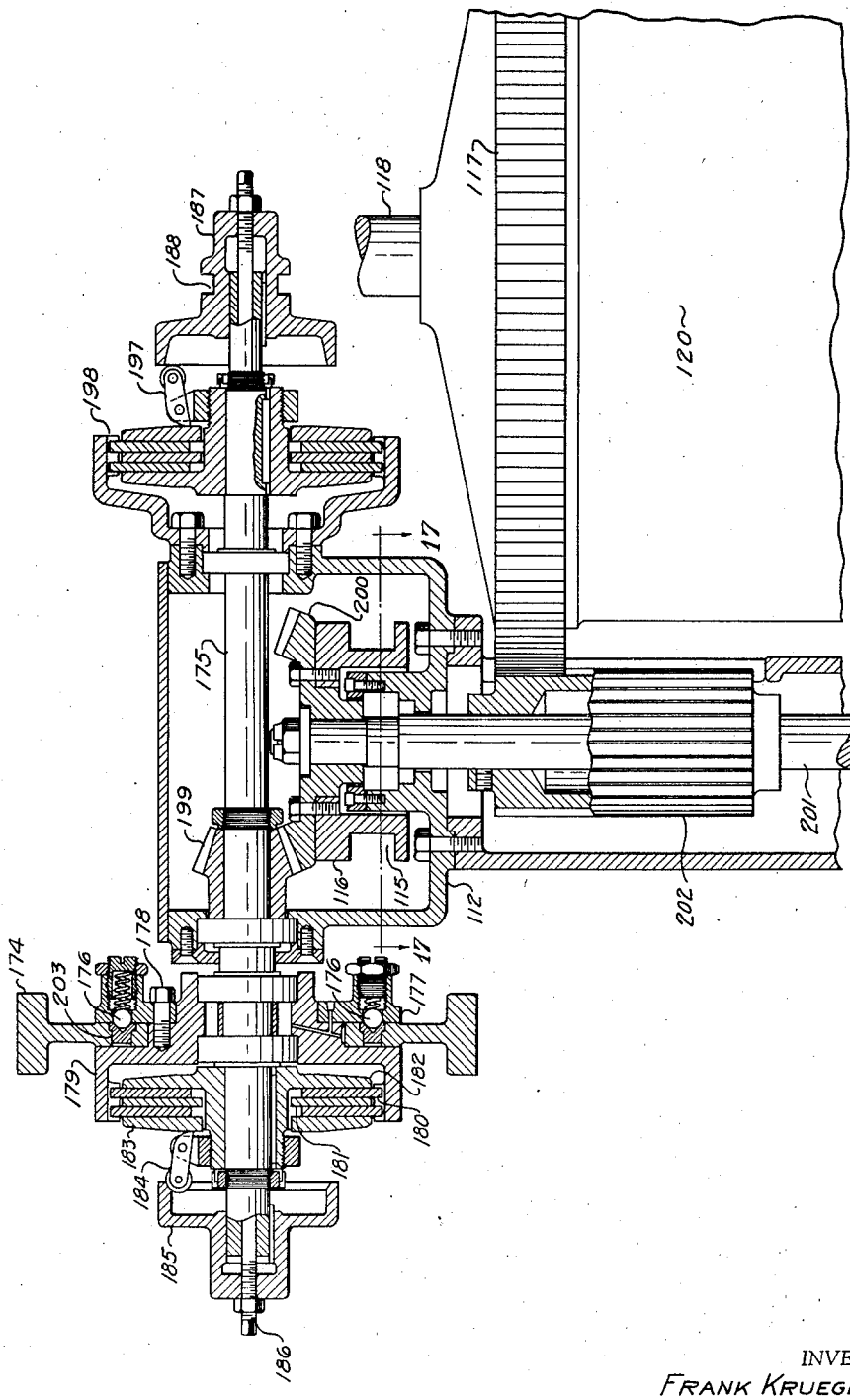
Fig. 23 is a cross-sectional view, showing the clutch and brake of the seaming head driving mechanism.
Figure 27A:
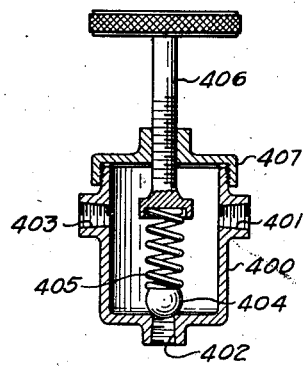
Fig. 27a is a cross-sectional view of the relief valve.

Such mechanism includes a driving pulley or sheave 174, which is driven by a belt or other suitable drive means (not shown) and which, in turn, drives the main drive shaft 175, through the intermediary of spring-pressed balls 176, plate 177, bolts 178, clutch housing 179, clutch drive plates 180, and clutch driven plates 181 and 182, the drive plates and driven plates being brought into frictional engagement with each other by means of a pressure plate 183, which is energized by a dog 184, when a dog-actuating member 185 is moved to the position shown in Fig. 23.

The member 185 is keyed to, but axially movable relatively to, the shaft 175 and is adjustably secured to the end of a rod 186 which extends through the shaft 175 and is slidable with respect to said shaft.

Adjustably secured to the other end of the rod 186 is a brake-dog actuating member 187, which has an annular groove 188 therein for the reception of the pins 189 of a brake actuating bellcrank lever 190. The lever 190 is pivoted, as at 191, to a bracket 192, which extends from the housing of the apparatus, and is adapted to be actuated through the intermediary of a hand lever 193, a shaft 194, a bell-crank lever 195 and connecting rod 196. An adjustable stop 196a is provided on the bracket 192 for limiting the extent of movement of the lever 193. The lever 193 is thus effective to manually start or stop the apparatus.

The member 187 is slidable with respect to the shaft 175 and, in energizing the brake, such member is moved to the left from the position shown in Fig. 23, thereby depressing the dog 197 and energizing the brake 198, which is generally similar in construction to the clutch. When the brake is thus energized, it will be apparent that the clutch is deenergized.

The shaft 175 has keyed thereto a bevel gear 199, which is in mesh with a bevel gear 200, which drives a vertically extending shaft 201, as well as the cam 116. The shaft 201 has secured thereto a pinion 202 which drives the gear 117, and thus, the seaming mechanism.

The shaft 201 carries at its lower end a gear 410 which, through an intermediate or idler gear 411, drives a gear 412, which is keyed to the shaft 135 of the chuck rotating mechanism. The shaft 135 also drives a gear 413, which, in turn drives a gear 414, which is keyed to the shaft 226a by which the wheel 226 is driven. The gear 412 also drives a gear 415, which is keyed to the shaft 9, and the gear 415, in turn, drives the gear 57, which is secured to the lower end of the shaft 56.

The idler gear 411 is mounted for rotation on a shaft 416, which is secured to the end of an arm 417, which is mounted for pivotal movement about the shaft 135. The gear housing carries a bracket 418, having a series of holes 419, which are arranged concentrically about the axis of the shaft 135. The arm 417 has a pair of spaced openings 420, through which bolts or screws may be passed, and which are adapted to enter the openings 419 to maintain the arm 417 in any desired position about the axis of the shaft 135. When it is desired to change the speed of the apparatus, it is only necessary to remove the bolts or screws which hold the arm 417 in position, replace the gear 410 by a larger or smaller gear, swing the gear 411 into mesh with the replacement gear, and lock the arm 417 in its adjusted position by means of the aforesaid bolts or screws.

It will be noted at this point that the drive from the flywheel 174 to the plate 177 is through spring-pressed balls 176, these balls normally occupying recesses in hardened steel inserts 203 in the flywheel. In the event of the apparatus becoming jammed, the balls 176 will be forced out of such recesses by the flywheel, and the flywheel will be free to rotate, without communicating its driving energy to the plate 177. This is a distinct safety feature.

Hydraulic control

Hydraulic control means are also provided for automatically stopping the apparatus in the event of failure in the supply can tops.

Figure 27:
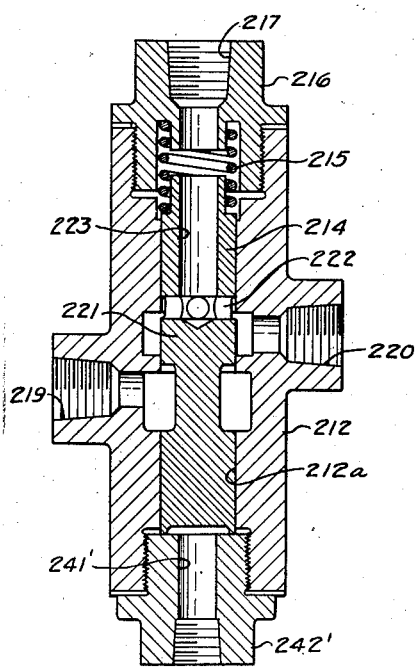
Fig. 27 is a cross-sectional view of the relay valve.

Such means is best illustrated in Figs. 1, 24, 25, 26, 26a, 27 and 27a, and may be described as follows:

A plunger 193a is mounted in a cylinder 204, which is secured to the bracket 192, and is adapted to be supplied with a fluid, such as oil, from a tank or reservoir 205, the oil from such reservoir being pumped to such cylinder by means of a pump 206 through a strainer 207, conduit 208, check valve 209, conduit 210, conduit 211, relay valve 212, and conduit 213. The valve 212, as shown in Fig. 27, comprises a cylindrical casing having a longitudinal bore 212a therein in which a plunger 214 is disposed, such plunger being normally maintained in the position shown, as by means of a spring 215 which is interposed between the upper end of the plunger and a nut 216 provided with a passage 217, a conduit 218 being secured to this nut. The valve has an inlet opening 219 and an outlet opening 220 which is in offset relation to the opening 219, the opening 219 communicating with the conduit 211 and the opening 220 with the conduit 213. Communication between the openings 219 and 220 is normally cut off by a portion 221 of the plunger 214, with the result that any oil in the cylinder 204 and conduit 213 will bleed back to the opening 220 and be returned to the reservoir 205 by way of radial passages 222 and axial bore 223 in the plunger 214, passage 217 in the nut 216, and the conduit 218. Further functions of the valve 212 will be described following a description of the operation of the apparatus as a whole.

The hydraulic control system further includes a pair of pilot valves 229 and 250, which are identical in construction, so that description of one will suffice for the other.

Figure 25:
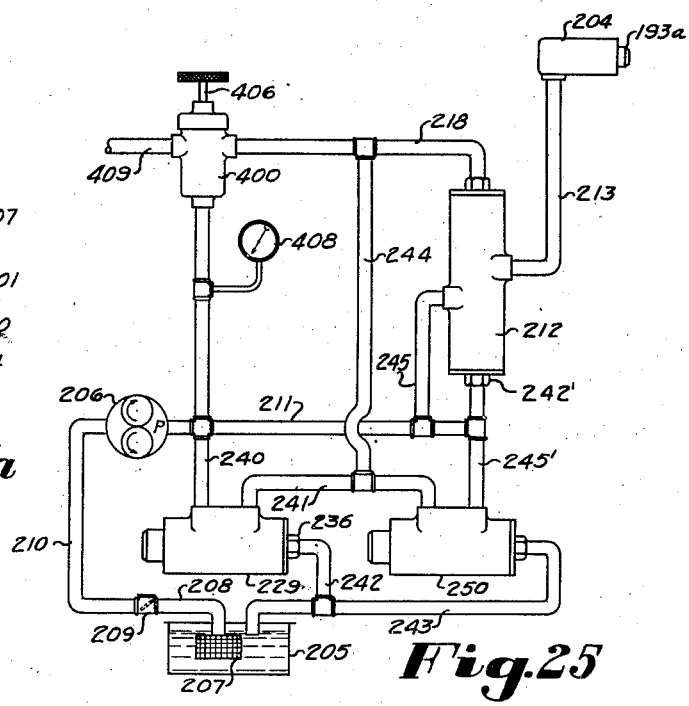
Fig. 25 is a view, illustrating more or less diagrammatically the hydraulic control means for the clutch and brake.

The valve 229 is in the form of a cylindrical casing having a reciprocable plunger 230 disposed therein, said plunger having an annular recess 231 therein and a second annular recess 232, which is spaced axially from the recess 231 and communicates with an axial bore 233 in one end of the plunger by way of radial passages 234 and an axial passage 234a. The bore 233 communicates with an axial passage 235 in a nut 236, which is secured to one end of the valve casing, a spring 237 being interposed between the nut and plunger to normally maintain the plunger in the position shown in Fig. 26. The valve casing is further provided with an inlet port 238 and an outlet port 239, the port 238 being in communication with the conduit 211 by way of a conduit 240 and the port 239 being in communication with the inlet port of the valve 250 by way of a conduit 241 (Fig. 25). A discharge conduit 242 extends from the nut 236 and communicates with a conduit 243, which extends from the discharge port of the valve 250 to the reservoir 205.

The valve 250, as previously stated, is identical in construction with the valve 229, the only difference being that in the valve 229, the inlet port 238 and outlet port 239 are normally in communication by way of the recess 231 in the plunger, whereas, in the valve 250, such ports are not normally in communication with each other.

The conduits 218 and 241 are in communication with each other by way of a conduit 244. The conduit 211 communicates with the inlet opening 219 of the relay valve 212 by means of a conduit 245, and also with a conduit 245', which extends from the outlet port of the valve 250 and is in communication with an axial passage 241' through a nut 242' in the lower end of the casing 212 of the relay valve.

A relief valve is also provided, comprising a casing 400 having ports 401, 402 and 403, the port 402 being normally closed by means of a ball 404, which is maintained in position by means of a spring 405, the tension of which may be adjusted by means of an adjusting screw 406 mounted in the cover 407 of the valve. The conduit 218 extends to the port 401 and the conduit 240 is extended to the port 402, a pressure gauge 408 being provided for the latter conduit. A conduit 409 extends from the port 403 and is adapted to supply lubricating oil to the seaming head and the various bearings of the apparatus.

Pivotally mounted adjacent the valve 229, as at 246, is a lever 246' having an arcuate portion 247 which lies in a slot 248 in the guide 88, and is engageable by the can tops which are moving as indicated in Fig. 2 (see Fig. 28). The opposite end of the lever 246' has adjustably secured thereto a screw 249 which engages the end of the plunger 230 in the valve 229. A coil spring 249' interconnects the lever 246' with the casing of the valve 229.

Pivotally mounted adjacent the valve 250, as at 251, is a lever 252, having a portion 253 which lies parallel to the guide rail 7 and extends into the space between the rails 7 and 8 so as to be engageable by the can bodies which are moving as indicated by the dotted lines in Fig. 1. The opposite end of the lever 252 has adjustably secured thereto a screw 254 which engages the end of the plunger 230 of the valve 250. A coil spring 255 interconnects the lever 252 with the valve casing 250.

Operation

The operation of the apparatus will be understood to a large extent from the aforesaid description of the various units, but a brief résumé of the operations will be helpful at this point, in order to bring out certain safety features.

Each can body B, which, as shown in Fig. 29, is provided at its upper end with an outwardly extending flange F, is moved by the spiral 4 to a position approximately indicated by the six o'clock position of the feed dial in Fig. 2, at which position, the flange F of the can body rests upon the ledge 27 of one of the members 26 and upon the ledge 34 of the guide 33. Disposed immediately above such can body at this point is a can top T, which, as shown in Fig. 29, has an offset horizontal flange F' which terminates in a rebent or curled flange F''.

The can body and top, in the relation shown in Fig. 28b, continue to be moved in an anticlockwise direction (Fig. 2) until they reach a position at a point on a line between the feed dial and the seaming head, as shown in Fig. 2, at which point, the outer edge of the flange F and F'' will be supported respectively by the ledges 123 and 124 of one of the members 122 of the seaming mechanism which has, in the meantime moved to a position for such support (see Fig. 29). From this point the direction of travel of the can body and top is in a clockwise direction, as viewed in Fig. 2.

In moving from the aforesaid position, there is a slight delay in the chucking of the can body and top in the seaming mechanism, during which interval, it is necessary that the can body and top be supported by both the member 26 and the member 122. For this purpose, the member 26 is momentarily cammed radially outwardly by the cam 21, as previously described, bringing it to the position shown in dotted lines in Fig. 32, after which it is returned radially inwardly to its normal position.

At the point indicated by the dotted lines T' in Fig. 32, the lift 170 which underlies the particular can body in question is elevated by the cam 171 and engages the lower end of such can body, causing the flange F to leave the ledge 123 of the member 122 and engage the flange F' of the can top, after which the flange F'' is lifted off the ledge 124 of such member, and the top moved into engagement with the stationary chuck 127, the can body and top being thus clamped between the lift 170 and chuck 127, but being rotatable about their axes. The relative position of the can body and top at this time is shown in Fig. 30.

With the can body and top thus chucked, the flanges F and F'' are subjected to a preliminary seaming operation by one of the rolls 152 and 153, which is brought into seaming relation with such flanges by means of the cam 143, after which the other seaming roll is brought into seaming relation with the flanges by means of such cam, the final seaming operation leaving the can body and top as shown in Fig. 31.

When the seamed cans reach a position approximately indicated by the six o'clock position of the seaming head in Fig. 2, they are released from the chucks and are stripped from the seaming mechanism as a result of engagement by a guide 224, and are moved onto the moving belt 1 by the blades 225 of a wheel 226, guides 227 and 228 assisting in the operation.

Figure 26A:
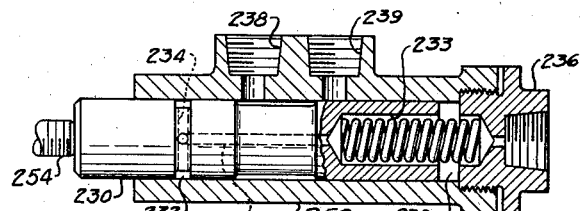
Fig. 26a is a cross-sectional view of the can body pilot valve.
Figure 26:
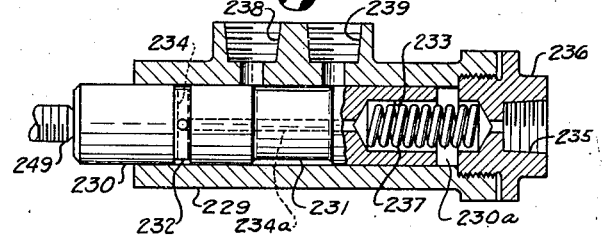
Fig. 26 is a cross-sectional view of the can top pilot valve.

During the operation of the apparatus, when can tops and bodies are being normally supplied, the plungers 230 in the valve housings 229 and 250 are maintained in the positions shown in Figs. 26 and 26a by the levers or feeler arms 246' and 252 respectively.

The continuously rotating pump 206 maintains the oil in constant circulation through the conduits 210, 240, port 238, recess 231, port 239 and conduits 241, 244, 218 and 409 to the lubrication system of the apparatus, and back to the reservoir 205.

In the event that can bodies fail to be supplied to the apparatus by the belt 1, the lever 46, by its resultant movement in a clockwise direction, imparts movement to the cam members 42 to thereby prevent further supply of can tops to the seaming head. Immediately after such operation of the lever 46, the lever 252, and concurrently therewith, the lever 246', will also be operated in a similar manner, thereby moving the plungers in the valves 229 and 250 to the right, as viewed in Figs. 26 and 26a.

This causes the pressure fluid (oil) to pass from the conduit 210 through conduits 211 and 245', port 239 of valve 250, recess 231 of said valve, to the conduits 241 and 244, and thereby maintaining unobstructed circulation, with the result that the apparatus continue to run, although neither can bodies nor tops are being supplied. Should, however, can bodies be supplied, and the can top magazine 38 be empty, then only the plunger in valve 229 will be operated, with the result that both pilot valves 229 and 250, and therefore the open circuit from the pump 206 to the conduit 218 will be obstructed. The fluid pressure will instantly rise to a point, as predetermined by the adjustment of the relief valve 400, and cause the plunger 214 to be elevated, thereby establishing communication between the openings 219 and 220 of the relay valve 212, and resulting in operation by the pressure fluid of the clutch disengaging plunger 193a in the cylinder 204. The concurrent application of the brake will cause stopping of the apparatus within a predetermined time interval.

It is thus seen that the hydraulic control effects the following operations:

(1) When can bodies and can tops are being supplied, the apparatus runs.

(2) When neither can bodies nor can tops are being supplied, the apparatus runs.

(3) When can bodies are being supplied, but not can tops, the apparatus stops.

In the last of the aforesaid situation, namely (3), in order to resume running of the apparatus, it is necessary to either remove the can bodies from interference with the lever 252 or to supply the magazine 38 with can tops.

Otherwise, the apparatus may be started or stopped manually by means of the hand lever 193, since the pressure fluid from the cylinder 204 will discharge through the conduit 213, relay valve opening 220, radial passages 222, bore 223 and conduit 218 to the conduit 409.

The annular recesses 232 of the pilot valves 229 and 250 serve the purpose of diverting oil leaks which may pass the valve and housing when under pressure, to return conduits 242 and 243, thence to the reservoir 205. The valve chambers 230a are also in open communication with the reservoir 205 to thereby relieve any back pressure during the operation of the plungers 230 to the right, as previously described.

Referring to Fig. 15, means are illustrated for adjusting the height of the feed dial so as to accommodate can bodies of varying heights. Such means comprises a jack-screw 261 which engages the lower end of the shaft 9 of the feed dial, and which may be rotated by means of a handwheel 262.

Figure 20:
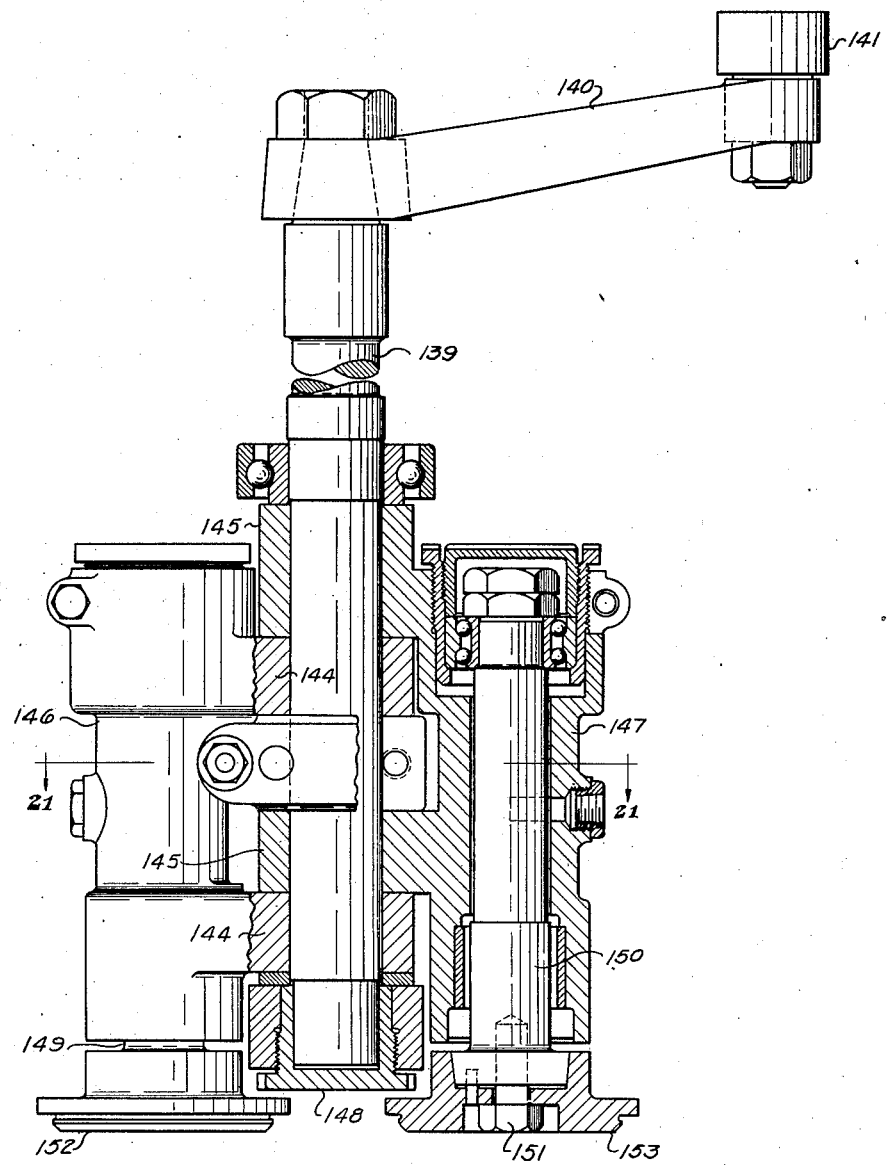
Fig. 20 is a view, partly in elevation, and partly in section, of one of the double-seaming members.

Referring to Fig. 20, it will be noted that a portion of the shaft, in the region indicated by the break, is of reduced diameter. This diameter is calibrated in such a way as to impart a resiliency to the shaft which is sufficient to permit the seaming rolls 152 and 153 to pass over the side seams of the cans, without causing breakage of any parts or requiring special compensating devices for this purpose.

The apparatus as thus described has been designed to seam from 350 to 500 cans per minute, and the construction and arrangement of the various units are such that perfect synchronization, in the movements of the various units, as is obviously required for such a high productive capacity, is easily attained.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

I claim:

1. In an apparatus for applying tops to can bodies, a transfer mechanism for delivering cans and tops from a feeding turret to a seaming turret, said mechanism comprising a revoluble dial member having a multiplicity of circumferentially spaced brackets thereon, means on said brackets for supporting a can body and top in spaced alignment with each other, pins passing through said dial and mounted thereon for substantially radial movement relative thereto, said brackets being pivoted on said pins for movement in a plane parallel with said dial, a grooved cam beneath said dial member and a cam follower carried by each of said pins and engaging said cam groove for moving each of said pins and brackets substantially radially outwardly of said dial at a predetermined point in the revolution of the dial, and means on the dial engaging the brackets only when said brackets are in their inner position to prevent pivotal movement of the brackets, said brackets moving out of contact with said engaging means as the brackets are moved outwardly to permit said brackets to pivot about said pins.

2. In an apparatus for applying tops to can bodies, a transfer mechanism for delivering cans and tops from a feeding turret to a seaming turret, said mechanism comprising a revoluble dial member having a multiplicity of circumferentially spaced brackets thereon, means on said brackets for supporting a can body and a can top in vertically spaced alignment with each other, pins carried by said dial for substantially radial movement relative thereto, said brackets being mounted on the pins for pivotal movement when the brackets are in their outermost position, a grooved cam beneath said dial member and a cam follower carried by each of said pins for cooperation with the cam groove for moving each of said pins and brackets substantially radially outwardly of said dial at a predetermined point in the movement of the dial and stop plates on the dial between adjacent brackets and contacting the same only when the brackets are in their inner position for preventing pivotal movement of the brackets around said pins.

3. In an apparatus for applying tops to can bodies, a transfer mechanism for delivering cans and tops from a feeding turret to a seaming turret, said mechanism comprising a revoluble dial member having a multiplicity of circumferentially spaced brackets thereon, means on said brackets for supporting a can body and a can top in vertically spaced alignment with each other, pins carried by said dial for substantially radial movement relative thereto, said brackets being mounted on the pins for pivotal movement therearound when the brackets are in their outermost position, a grooved cam beneath said dial member and a cam follower carried by each of said pins for cooperation with said cam groove for moving each of said pins and brackets substantially radially outwardly of said dial at a predetermined point in the movement of the dial, stop plates on the dial between adjacent brackets for limiting pivotal movement of the brackets around said pins, said stop plates having beveled surfaces for engagement with similar beveled surfaces on the brackets when the brackets are retracted to their inner position so as to prevent pivotal movement of the brackets when so positioned.

4. In an apparatus for applying tops to can bodies, a transfer mechanism for delivering cans and tops from a feeding turret to a seaming turret, said mechanism comprising a revoluble dial member having a multiplicity of circumferentially spaced brackets thereon, means on said brackets for supporting a can body and a can top in vertically spaced alignment with each other, pins carried by said dial for substantially radial movement relative thereto, said brackets being mounted on the pins for pivotal movement therearound when the brackets are in their outermost position, a grooved cam beneath said dial member and a cam follower carried by each of said pins for cooperation with said cam groove for moving each of said pins and brackets substantially radially outwardly of said dial at a predetermined point in the movement of the dial, stop plates on the dial between adjacent brackets for limiting pivotal movement of the brackets around said pin, said stop plates having faces converging toward the center of the dial and the brackets having similarly converging faces on opposite sides thereof engaging the inclined stop faces to center the brackets between the stops when the brackets are in their inner position and to prevent pivotal movement thereof.

FRANK KRUEGER.